(12) United States Patent
Kobayashi et al.

(10) Patent No.: US 10,749,433 B2
(45) Date of Patent: Aug. 18, 2020

(54) CURRENT BALANCE FEEDBACK CIRCUIT AND METHOD TO IMPROVE THE STABILITY OF A MULTI-PHASE CONVERTER

(71) Applicant: Dialog Semiconductor (UK) Limited, London (GB)

(72) Inventors: Hidenori Kobayashi, Kawasaki (JP); Seiichi Ozawa, Wakoh (JP); Daisuke Kobayashi, Setagaya-ku (JP)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/131,799

(22) Filed: Sep. 14, 2018

(65) Prior Publication Data
US 2020/0091819 A1   Mar. 19, 2020

(51) Int. Cl.
*H02M 3/158*   (2006.01)
*H02M 1/088*   (2006.01)
*H02M 1/00*   (2006.01)

(52) U.S. Cl.
CPC .......... *H02M 3/158* (2013.01); *H02M 1/088* (2013.01); *H02M 3/1584* (2013.01); *H02M 2001/0048* (2013.01)

(58) Field of Classification Search
CPC .... H02M 3/156; H02M 3/158; H02M 3/1588; H02M 3/155; H02M 3/1582; H02M 3/157; H02M 3/1563; H02M 2003/1566; H02M 2003/1557; H02M 2001/0012; H02M 2001/0009

USPC ......................................... 323/282–285, 237
See application file for complete search history.

(56) References Cited

U.S. PATENT DOCUMENTS

| | | |
|---|---|---|
| 4,307,441 A | 12/1981 | Bello |
| 6,215,290 B1 | 4/2001 | Yang et al. |
| 6,414,470 B1 | 7/2002 | Liu et al. |
| 8,085,015 B2 | 12/2011 | Lee |
| 2002/0125869 A1* | 9/2002 | Groom ................ H02M 3/1584 323/283 |
| 2003/0201761 A1 | 10/2003 | Harris |
| 2003/0223253 A1 | 12/2003 | Chen et al. |
| 2004/0190314 A1 | 9/2004 | Yoshida |
| 2007/0013356 A1 | 1/2007 | Qiu et al. |
| 2008/0197824 A1 | 8/2008 | Qiu et al. |

(Continued)

FOREIGN PATENT DOCUMENTS

| | | |
|---|---|---|
| JP | 2017-85856 | 5/2017 |
| JP | 2017-85858 | 5/2017 |

*Primary Examiner* — Bryan R Perez
(74) *Attorney, Agent, or Firm* — Saile Ackerman LLC; Stephen B. Ackerman

(57) ABSTRACT

A solution is provided for a current balance feedback method to improve stability in a multi-phase DC-DC switching converter, where the current balance feedback signal is added to the PWM duty signal, after the PWM comparator. Using this feedback method, current balance oscillation issues caused by the non-linearity of the main control loop can be solved, and provide better current balance stability in the switching converter. Advantages include improving the stability of the current balance feedback loop by introducing the correction post PW modulation in the time domain, effectively bypassing interaction with the PW modulator. The current balance feedback loop stability improvement reduces PCB design effort and iteration.

22 Claims, 9 Drawing Sheets

(56) References Cited

U.S. PATENT DOCUMENTS

| | | |
|---|---|---|
| 2010/0109621 A1* | 5/2010 | Lee .................... H02M 3/1584 |
| | | 323/268 |
| 2010/0315051 A1 | 12/2010 | Maher |
| 2012/0146546 A1 | 6/2012 | Hu et al. |
| 2012/0236610 A1 | 9/2012 | Lee et al. |
| 2013/0194848 A1 | 8/2013 | Bernardinis et al. |
| 2014/0028273 A1* | 1/2014 | Schmitz ................ H02M 3/158 |
| | | 323/271 |
| 2014/0253063 A1* | 9/2014 | Sreenivas ............... H02M 1/08 |
| | | 323/271 |
| 2016/0049874 A1* | 2/2016 | Kobayashi ............ H02M 3/157 |
| | | 323/271 |
| 2017/0214318 A1 | 7/2017 | Takenaka |

* cited by examiner

CURRENT BALANCE FEEDBACK CIRCUIT AND METHOD TO IMPROVE THE STABILITY OF A MULTI-PHASE CONVERTER

BACKGROUND

Field

The present disclosure relates generally to a DC-DC switching converter, and more specifically to a current balance feedback method to improve stability.

Background

In a multi-phase DC-DC switching converter, a current balance feedback circuit is required to balance the current of each phase. The circuit monitors the output current, and adds the offset of each phase's control signal to the output current to equalize the phase, and to achieve better efficiency and current capability in the switching converter.

However in practice, there is some non-linearity in the main control loop of a multi-phase DC-DC switching converter. The current balance feedback circuit can cause instability and current oscillation, and even though the total output current remains constant, each phase current is not stable.

A current balance feedback method to improve stability in a multi-phase DC-DC switching converter is therefore desirable.

SUMMARY

Accordingly, it is an object of one or more embodiments of the present disclosure to provide a current balance feedback method to improve stability in a multi-phase DC-DC switching converter.

It is a further object of one or more embodiments of the disclosure to improve the stability of the current balance feedback method by introducing the correction post pulse width modulation, in the time domain, effectively bypassing interaction with the pulse width modulator.

Still further, it is an object of one or more embodiments of the disclosure to provide a current balance feedback method that alleviates printed circuit board (PCB) design work, and reduces PCB effort and iteration.

Other objects will appear hereinafter.

The above and other objects of the present disclosure may be accomplished in the following manner. A current balance feedback circuit, in a multi-phase DC-DC switching converter, is disclosed, comprising a pulse width modulator, further comprising a primary pulse width modulation signal at its output. The circuit further comprises a current circuit, configured to compare a first phase current with a second phase current, and to provide a current error signal. The circuit further comprises a pulse expander, coupled to the current circuit and to the pulse width modulator, where the pulse expander is configured to add a delay to the primary pulse width modulation signal, and to provide a secondary pulse modulation signal, where delay varies linearly with the current error signal.

The above and other objects of the present disclosure may be further accomplished by a method for a current balance feedback method, to improve stability in a multi-phase DC-DC switching converter. The steps include providing a primary pulse width modulation signal. The steps also include comparing a first phase current with a second phase current, to provide a current error signal. The steps also include adding a delay to the primary pulse width modulation signal, where a length of the delay is based on the current error signal, to provide a secondary pulse modulation signal.

In various embodiments the function may be used for a voltage mode multi-phase DC-DC switching converter.

In various embodiments the function may be used for a current mode multi-phase DC-DC switching converter.

In various embodiments the function may be achieved where the master phase and slave phases share the same current balance feedback circuit.

In various embodiments the function may be achieved where the master and slave phase utilize a pulse expander with a fixed input in the master phase.

In various embodiments the function may be achieved with an analog configuration.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DETAILED DESCRIPTION

The present disclosure provides a current balance feedback method to improve stability in a multi-phase DC-DC switching converter.

In a conventional current balance feedback method, the signal is fed-back and added to the control signal before the PWM comparator in the switching converter. In the new current balance circuit of the disclosure, the current balance feedback signal is fed-back and added to the PWM duty signal after the PWM comparator. Using this new feedback method, the current balance oscillation issue caused by the non-linearity of the main control loop can be solved, and provide better current balance stability.

Figure 1A:
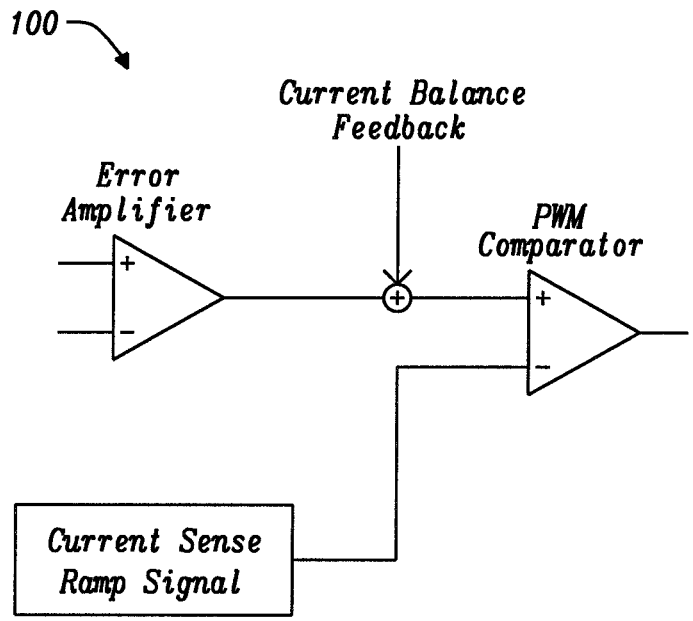
FIGS. 1A & 1B illustrate current balance feedback added to the error amplifier output, or to the current sense ramp signal, with conventional methods.
Figure 1B:
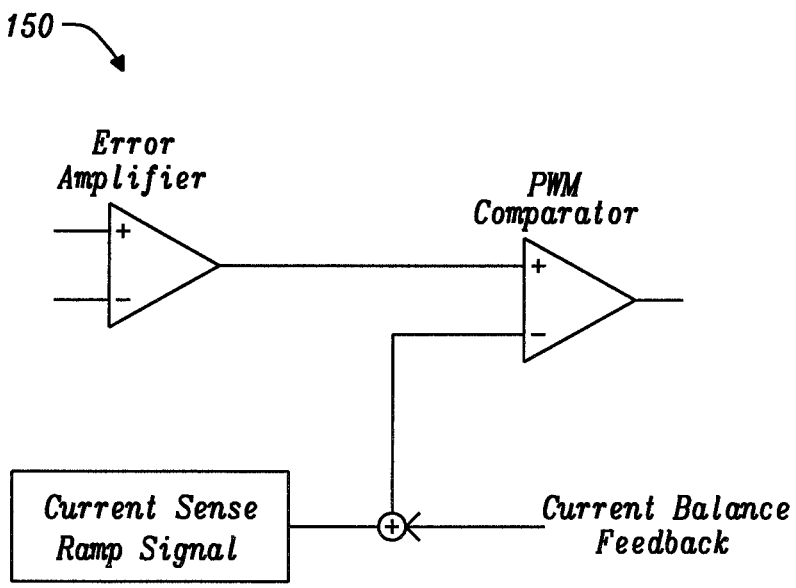

FIGS. 1A & 1B illustrate current balance feedback added to the error amplifier output in 100, or to the current sense ramp signal in 150, for conventional methods. In this approach, the current balance feedback is input before the PWM comparator in the DC-DC switching converter. For example, the Current Balance Feedback may be added either to the control signal (Error Amplifier output) at the non-inverting input to the PWM Comparator as shown in FIG. 1A, or added to the Current Sense Ramp Signal at the inverting input to the PWM Comparator as shown in FIG. 1B.

Figure 2:
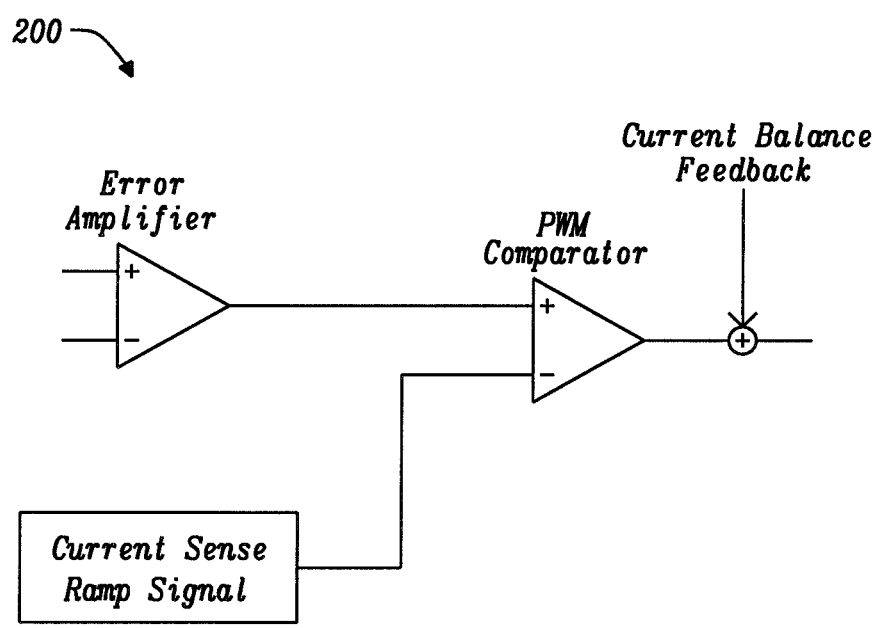
FIG. 2 shows current balance feedback added after the PWM comparator, in the present disclosure.

FIG. 2 shows current balance feedback 200 added after the PWM comparator, in the present disclosure. It is proposed to add the Current Balance Feedback after the PWM Comparator. In this way, the Current Balance Feedback loop is not affected by the signal-to-duty conversion, as illustrated and later described in FIG. 4, done by the PWM Comparator.

In a noisy environment, the signal-to-duty conversion is not perfect, and includes some nonlinearity. If this nonlinearity is included in the current balance feedback loop, there is a risk of causing current balance loop instability. Eliminating the signal-to-duty conversion from the current balance loop causes the current balance to become more stable and less noise sensitive, in multi-phase DC-DC switching converters.

Figure 3A:
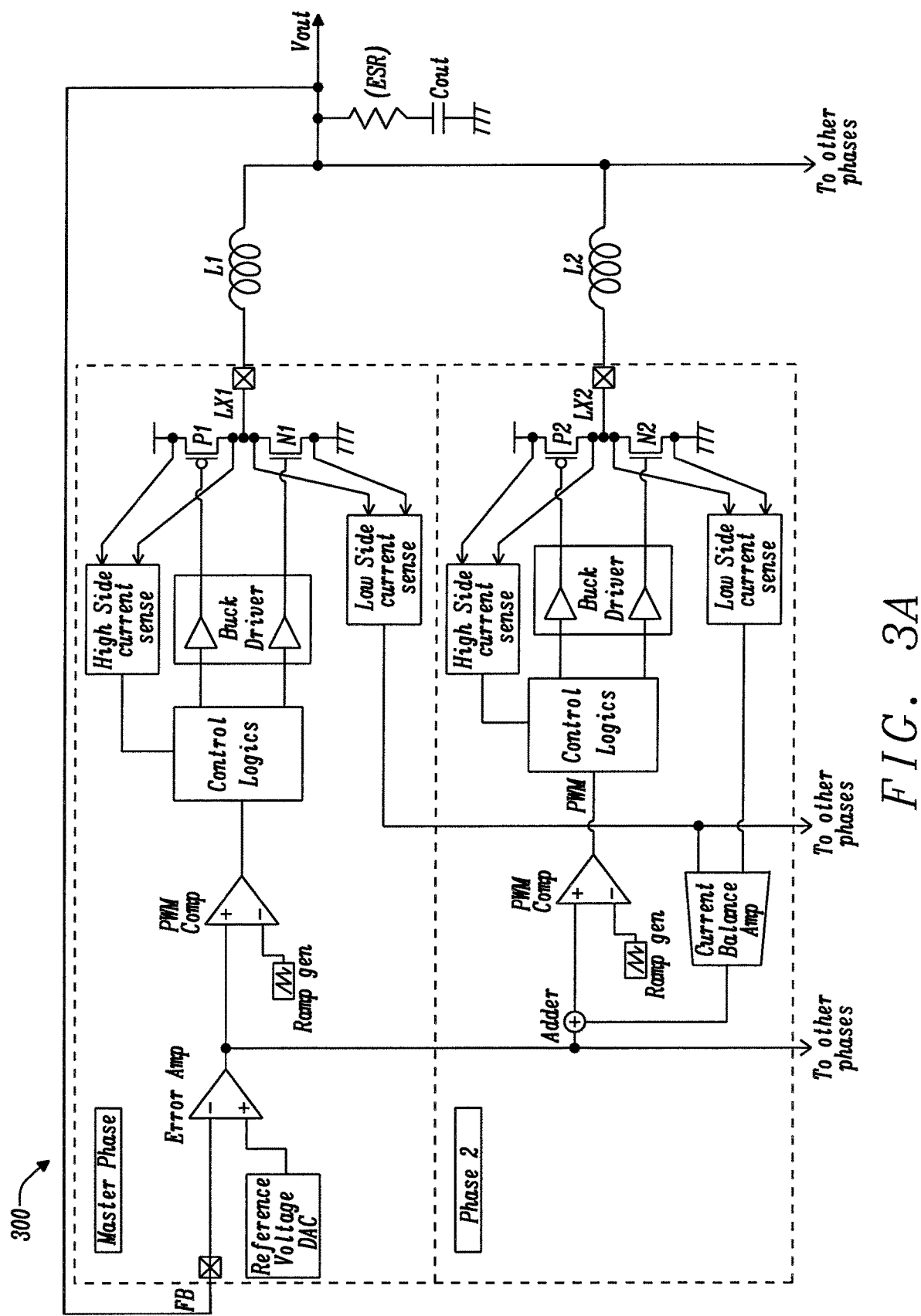
FIGS. 3A & 3B illustrate a voltage mode multi-phase block diagram for both a conventional method, and a method of the present disclosure.
Figure 3B:
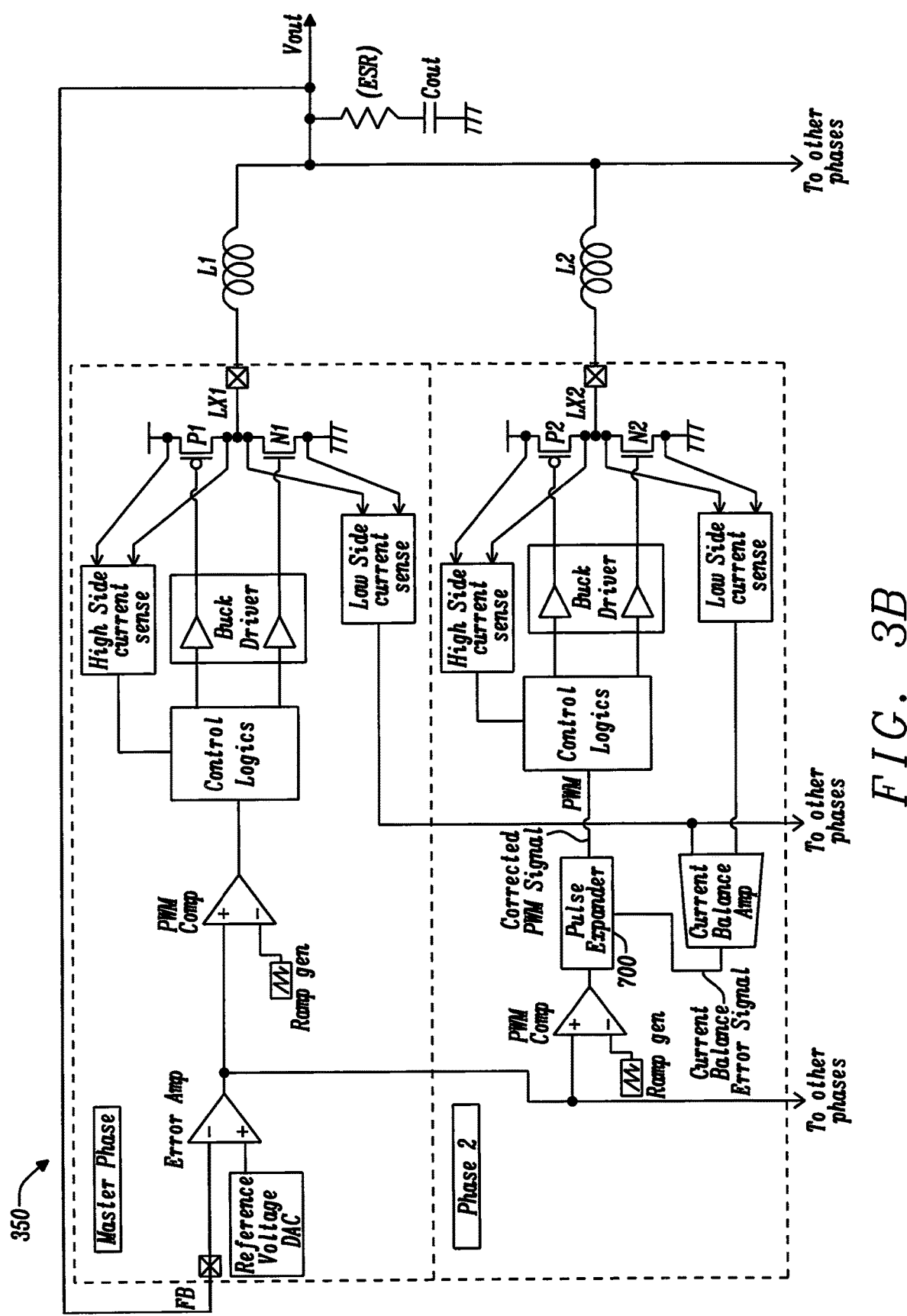

FIGS. 3A & 3B illustrate a voltage mode multi-phase block diagram for both a conventional method 300, and a method of the present disclosure 350. The error amplifier (Error amp) is shared with both phases, and receives the output feedback voltage Vout at FB, and a Reference Voltage DAC. Although only two phases are shown, FIGS. 3A & 3B also pertain to multi-phase DC-DC switching converters.

Each phase (Master Phase and Phase 2) in FIGS. 3A & 3B has a dedicated PWM comparator (PWM comp), current sense ramp signal (Ramp gen), and an output stage, consisting of High side and Low side current sense, Control Logics, Buck driver, and High side and Low side drivers P1/N1 and P2/N2.

With the conventional methods of current balance in FIGS. 1A, 1B, and 3A, the output current is monitored across the High side and Low side drivers, or by using the equivalent series resistance (ESR), related to the output capacitor Cout. In FIG. 3A, the sensed currents from Low side current sense are compared in Current Balance Amp. The current balance error signal, output from Current Balance Amp, is added to the control signal (Error Amp output), and input to the PWM comparator (PWM comp). PWM comp then creates the pulse width modulation (PWM) duty signal.

If there is a mismatch of PWM comparators, driver stages, or even output inductors L1 and L2, each phase will have a different output current. In FIG. 3A to output a 1 A current, one phase could, for example, output 100 mA and another phase output 900 mA. Since the output voltage Vout is regulated, the main control loop must then correct the current imbalance in the switching converter. Mismatch of the PWM comparators, driver stages, or inductors creates an average output current mismatch between the phases, making the new current balance feedback circuit desirable.

With the methods of the present disclosure in FIG. 3B, the output current is still monitored across the High side and Low side drivers, or through ESR sensing, related to the output capacitor Cout, and the sensed currents from Low side current sense are compared in Current Balance Amp. What differs is that the Current Balance Error Signal, output from the Current Balance Amp, is now used to add some delay to the falling edge of the PWM signal generated initially by PWM comp, and the Corrected PWM Signal supplies the pulse width modulation (PWM) duty signal to the Control Logic. The Current Balance Amp generates a signal, which is proportional to the difference between its two inputs, one being the master phase current sense output signal, and the other being the slave phase current sense output signal. For multiple phases, the Current Balance Amp is connected such that in each phase, that phase's current sense is compared to the master phase current sense.

Figure 4:
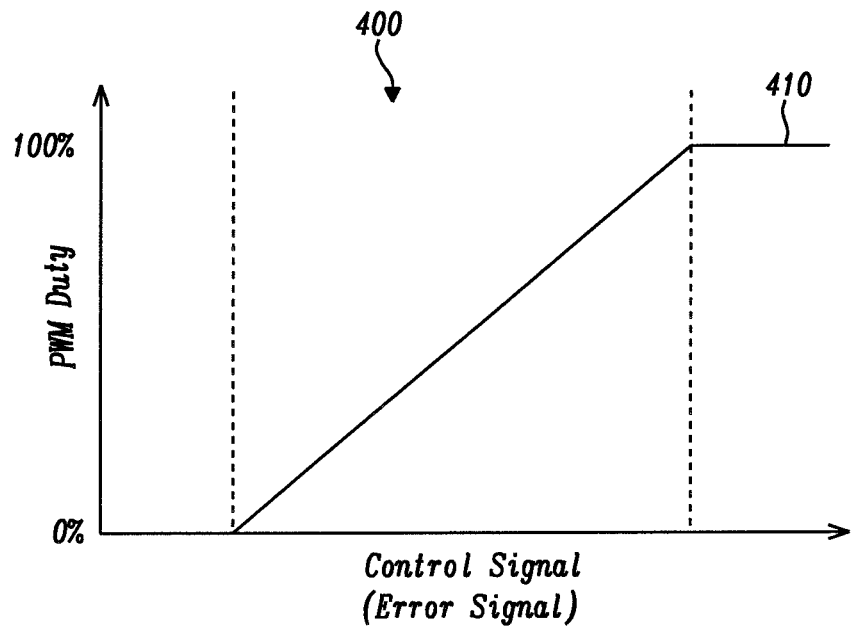
FIG. 4 shows a linear relationship between the control signal and the PWM duty signal, for ideal conditions.

FIG. 4 shows 400, a linear relationship between the control signal and the PWM duty signal, for ideal conditions. For example in voltage mode control, the error amplifier output and PWM duty signal are linearly related, as in 410. As long as the conversion is perfectly continuous and linear, there is no hysteresis on the current balance feedback loop.

Figure 5:
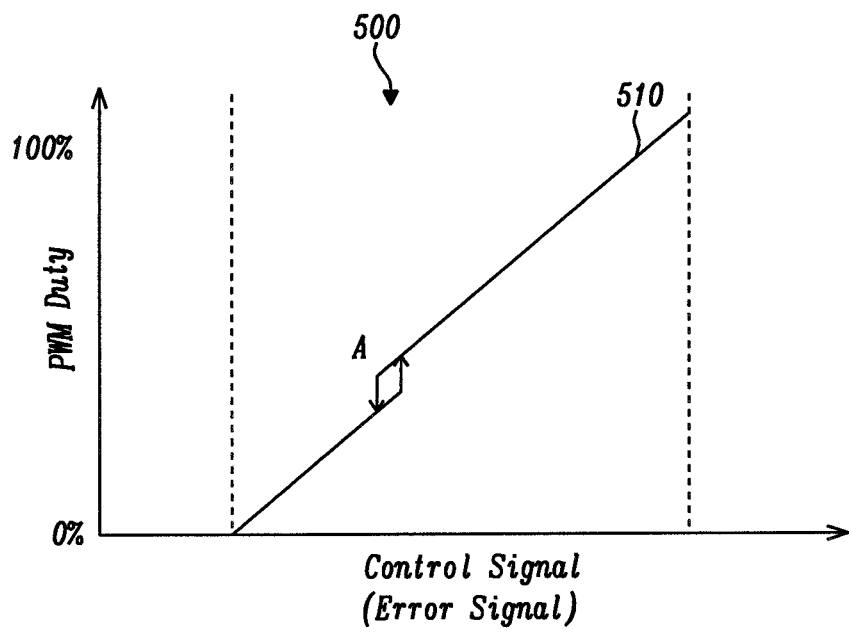
FIG. 5 illustrates a linear relationship between the control signal and the PWM duty signal, for non-ideal conditions.

FIG. 5 illustrates 500, a linear relationship between the control signal and the PWM duty signal, for more typical and non-ideal conditions. For example the DC-DC switching converter is usually noisy, and the conversion will behave as if there is a discontinuous point, with hysteresis on the current balance feedback loop, as indicated by "A" in 510.

Such hysteresis is not desired, and creates jitter, or a level of transient response degradation on the output. As long as this is at an acceptably low level, it is not a critical issue in a single phase switching regulator. However, this is a critical issue for the current balance feedback loop in a multi-phase switching converter. If the discontinuous and hysteresis condition exists in the control signal to duty signal conversion, and if the PWM duty signal is similar to "A" in FIG. 5, the current balance feedback loop causes instability, and large current oscillation occurs. Without fixing the non-linear issue of the control signal and PWM duty signals, the current instability cannot be avoided.

A solution is proposed with the present disclosure, where an additional signal in the duty signal conversion circuit is dedicated to the current balance feedback. With this solution, the main signal-to-duty signal conversion can have a non-linear behavior, and the current balance feedback loop is added for stabilization. The amount of stabilization needed depends on the degree of non-ideal conditions in the existing system.

Figure 6:
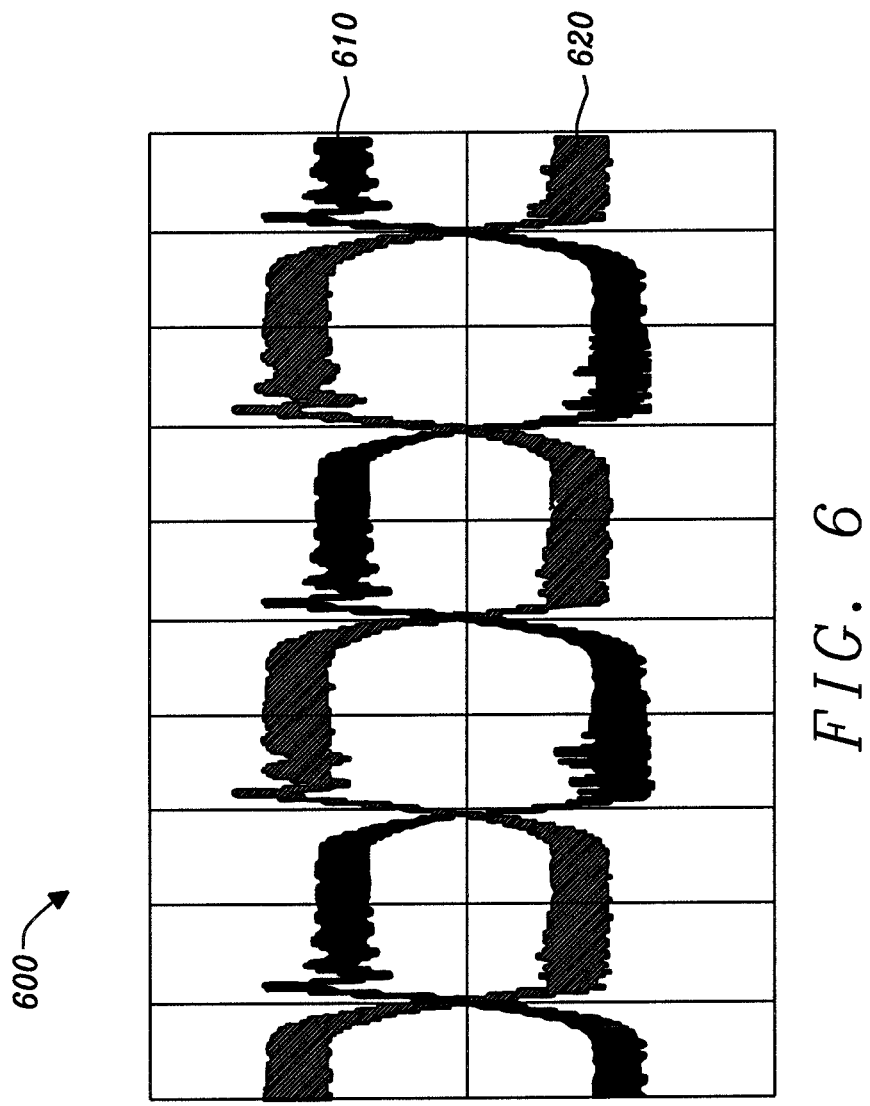
FIG. 6 shows an inductor current waveform with current balance instability, in a dual phase switching converter.

FIG. 6 shows 600, inductor current waveforms with current balance instability, in a dual phase switching converter. 620 and 610 show phase 1 and 2 inductor currents, respectively. Even though the output voltage is regulated, each phase current goes low and high alternatively, causing current oscillation and hysteresis. In the present disclosure, one circuit is added on the output signal of the PWM comparator. The circuit adds delay to the PWM duty signal, determined by the current balance error.

Figure 7:
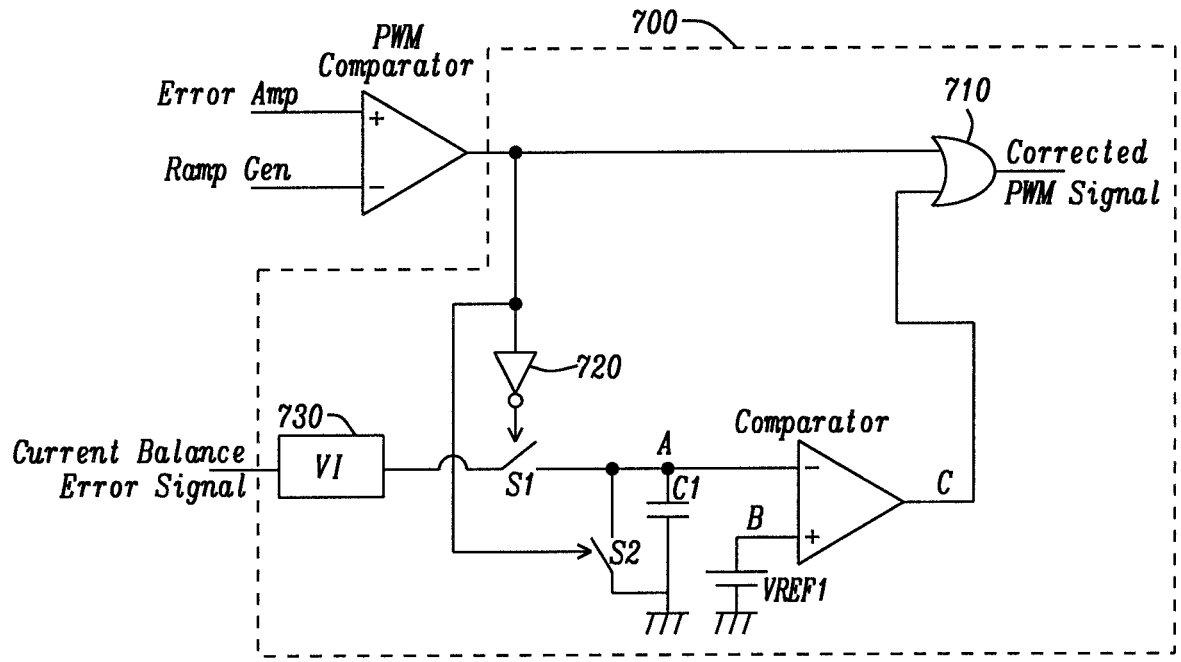
FIG. 7 illustrates a pulse expander circuit diagram of the present disclosure.

FIG. 7 shows Pulse Expander 700, a circuit diagram of the present disclosure. The multi-phase switching converter comprises, for each phase, a pulse width modulator (PWM Comparator) that provides a primary pulse width modulation signal, based on inputs Error Amp and Ramp gen. Comparator provides output signal C to Or gate 710. The pulse expander logic is adapted to delay the falling edge of the primary pulse width modulation signal from the output of the PWM Comparator, and to provide a secondary pulse modulation signal. The delay added by the pulse expander varies linearly with the Current Balance Error Signal. The primary pulse width modulation signal at the output of the PWM Comparator comprises a rising edge and a falling edge, and the delay is added, preferably, to the falling edge to make the PWM duty signal longer. By doing this, the PWM duty signal (for the on pulse) will be longer/increased, and the output current will be increased.

The current balance feedback circuit comprises a comparator for comparing a signal at node A, with a reference value at B, which is connected to ground across reference voltage VREF1. In FIG. 7, the Current Balance Error Signal is used for controlling the slope of the output of VI 730, a voltage to current converter. When the output of the PWM comparator changes from high to low, switch S1 is on and switch S2 is off. The output current of VI 730 starts to charge capacitor C1 according to the Current Balance Error Signal. When the Current Balance Error Signal is higher, the charge current is higher, and the capacitor will charge faster.

When C1 capacitor voltage and fixed reference voltage VREF1 are compared, and the charge speed is faster for a higher Current Balance Error Signal, C1 capacitor voltage A becomes the level of voltage reference VREF1 quickly, and the delay time of Pulse Expander 700 is shorter. When the charge speed is slower for a lower Current Balance Error Signal, C1 capacitor voltage A takes more time to become the level of voltage reference VREF1, and the delay time of Pulse Expander 700 is longer.

An alternative current balance feedback circuit fixes the slope at A, and delay can be added to the falling edge of the pulse width modulation signal. Assuming the current balance loop is slow and contains less high frequency noise than the error amplifier output, the method of the present disclosure is effective compared to conventional methods.

Pulse expander 700 of FIG. 7 is added to all phases except the master phase. The objective of the Current Balance Amp is to equalize the current between the phases. If the slave phase current is adjusted to the current of the master phase, then the objective of the disclosure is achieved, and there is no need to adjust the master phase current.

Figure 10A:
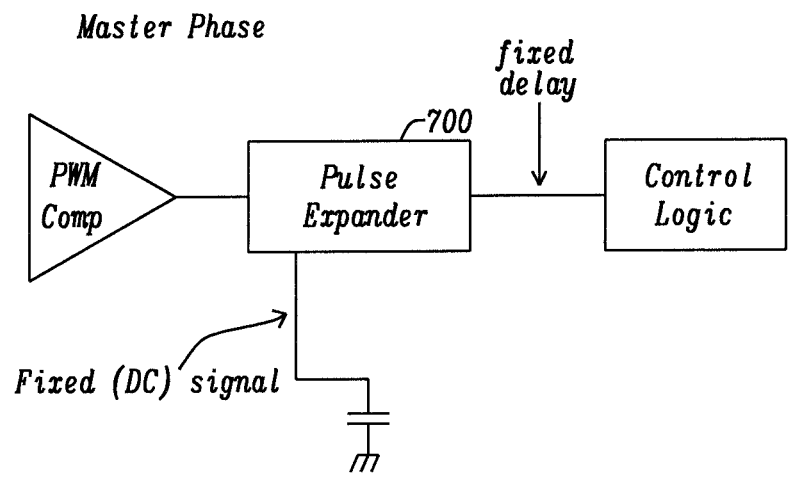
FIG. 10A illustrates where a fixed signal is input to the pulse expander, in the master phase of the DC-DC switching converter.
Figure 10B:
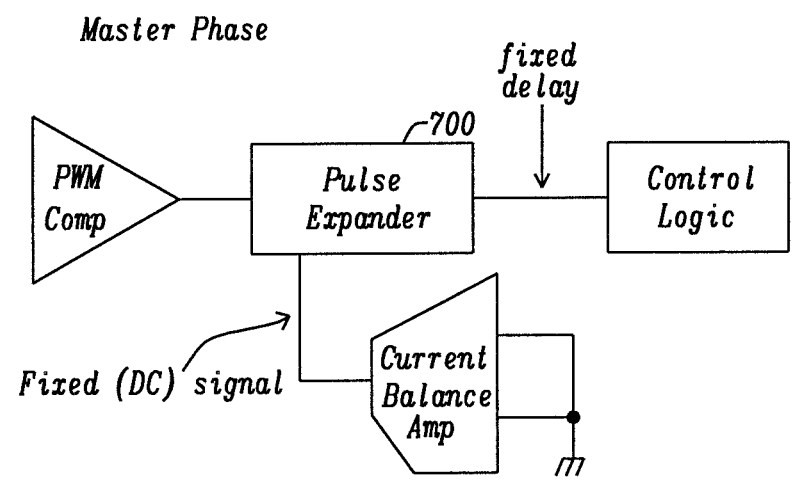
FIG. 10B illustrates where a current balance amp used in the slave phase is used to provide a fixed input to the pulse expander, in the master phase of the DC-DC switching converter.

In another embodiment of the disclosure, both the master and slave phase can utilize pulse expander 700, with a fixed input for the pulse expander in the master phase, so that there is a fixed delay in the master phase. FIG. 10A illustrates one variation of this embodiment, where a fixed (DC) signal is input to the pulse expander, which provides a PWM signal with fixed delay to the Control Logic. Similarly, as shown in FIG. 10B, the same current balance amp as is used in the slave phase (see FIG. 3B) can be used to provide a fixed input to the pulse expander 700, by connecting both current balance amp inputs to ground, resulting in a fixed (DC) signal output.

The present disclosure applies to any multi-phase power driver and to any number of phases, where the current needs to be accurately balanced between the multiple phases. A third or any additional phase would have a circuit similar to Phase 2 in FIG. 3B, where the slave phase is shown with a pulse expander. The circuitry of the disclosure is useful in multi-phase systems to avoid premature saturation of the inductors.

Inductors L1 and L2 can be of different sizes, for example one large and one small. Since the average output current is analog, the desired current ratio can be set between the two phases, by choosing the values of the inductors accordingly.

Figure 8:
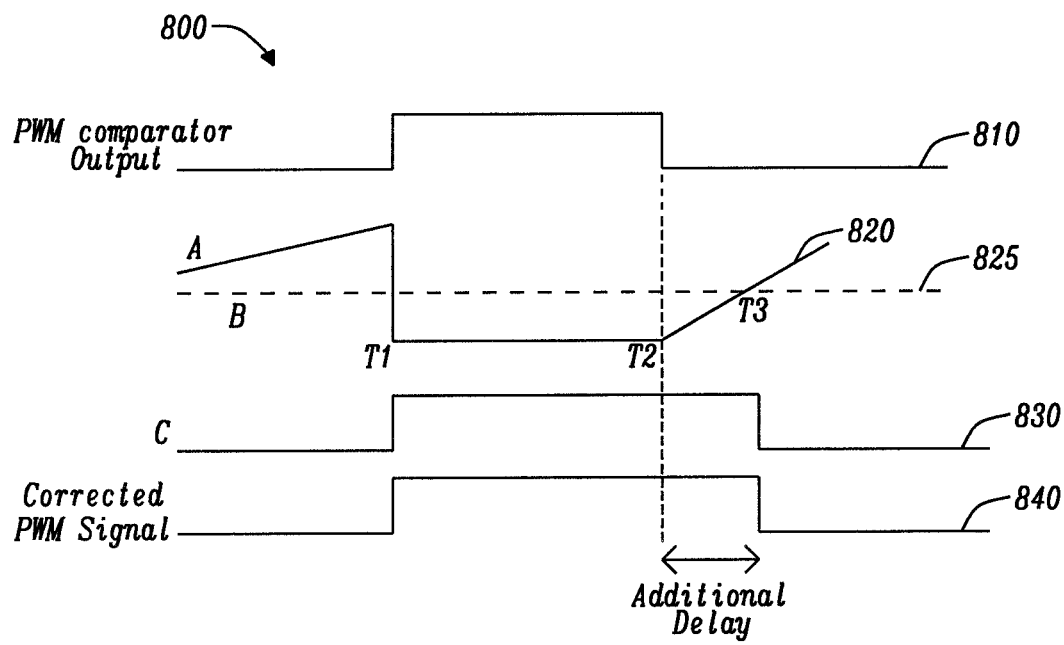
FIG. 8 shows a timing diagram for the expanded PWM signal, with the additional delay of the present disclosure.

FIG. 8 shows 800, a timing diagram for the expanded PWM signal, with the additional delay of the present disclosure. When signal 820 A becomes lower than reference value 825 B, at time T1, Comparator output 830 C rises. At time T2, after the PWM comparator output falls, the signal 820 at node A starts to rise, but is below reference value B, so that a delay is generated on the Corrected PWM signal. The Corrected PWM signal 840 includes Additional Delay, where the amount of delay is related in a linear fashion to the Current Balance Error Signal. Additional Delay ends at time T3, when signal 820 A becomes higher than reference value 825 B.

The present disclosure applies to any multi-phase power driver and to any number of phases, where the current needs to be accurately balanced between the multiple phases. A third or any additional phase would have a circuit similar to Phase 2 in FIG. 3B, where the slave phase is shown with a pulse expander. The circuitry of the disclosure is essential in multi-phase systems to avoid premature saturation of the inductors.

Figure 9:
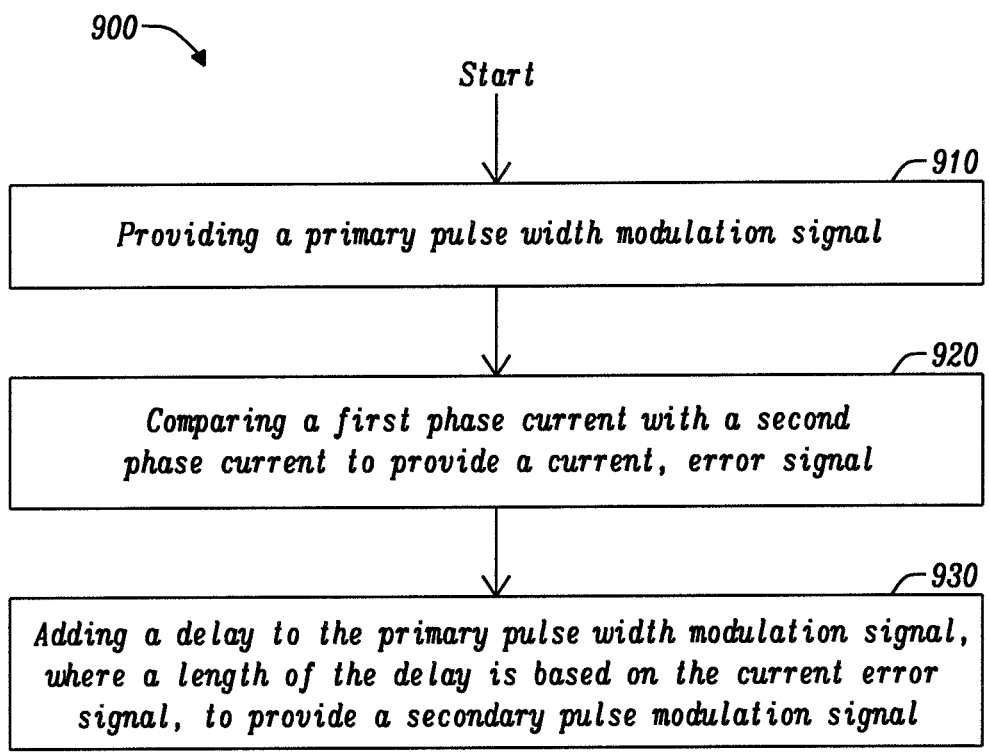
FIG. 9 is a flow chart of a current balance feedback method to improve stability, in a multi-phase DC-DC switching converter.

FIG. 9 is flow chart 900 of a current balance feedback method, to improve stability in a multi-phase DC-DC switching converter. The steps include 910, providing a primary pulse width modulation signal. The steps also include 920, comparing a first phase current with a second phase current, to provide a current error signal. The steps also include 930, adding a delay to the primary pulse width modulation signal, where a length of the delay is based on the current error signal, to provide a secondary pulse modulation signal.

The advantages of one or more embodiments of the present disclosure include improving the stability of the current balance feedback loop by introducing the correction post PW modulation in the time domain, effectively bypassing interaction with the PW modulator. The current balance feedback loop stability improvement also alleviates PCB design work, and reduces PCB effort and iteration. Non-ideal PCB patterns generate more noise, and cause more non-linearity in how the control signal varies with the PWM duty conversion, as in FIG. 5. Therefore, there is more chance of current instability with conventional current balance circuitry.

While particular embodiments of the present disclosure have been illustrated and described, it will be understood by those skilled in the art that various changes in form and details may be made without departing from the spirit and scope of the invention.

The invention claimed is:

1. A current balance feedback circuit, in a multi-phase DC-DC switching converter, comprising:
   a pulse width modulator, configured to provide a primary pulse width modulation signal to a first pulse expander;
   a current balance circuit, configured to compare a master phase current with a slave phase current and to provide a current error signal, proportional to a difference between the master phase current and the slave phase current, to said first pulse expander; and
   said first pulse expander, coupled to said current balance circuit and to said pulse width modulator, wherein said first pulse expander is configured to add a delay in a turn-off time to said primary pulse width modulation signal output from a PWM comparator, wherein a length of said delay is shorter for a higher current error signal and longer for a lower current error signal, and to produce a secondary pulse modulation signal.

2. The current balance feedback circuit of claim 1, wherein said primary pulse width modulation signal comprises a rising edge and a falling edge, and wherein said delay is added to said falling edge.

3. The current balance feedback circuit of claim 1, wherein said first pulse expander comprises a comparator for comparing said current error signal with a reference value, connected to ground.

4. The current balance feedback circuit of claim 1, wherein said current balance circuit is an analog circuit.

5. The current balance feedback circuit of claim 1, wherein said multi-phase DC-DC switching converter is a voltage mode switching converter.

6. The current balance feedback circuit of claim 1, wherein said multi-phase DC-DC switching converter is a current mode switching converter.

7. The current balance feedback circuit of claim 1, wherein said multi-phase DC-DC switching converter comprises a master phase and a plurality of slave phases, wherein each of said plurality of slave phases includes one of said current balance feedback circuits.

8. The current balance feedback circuit of claim 1, wherein said secondary pulse modulation signal current is balanced between multiple inductors.

9. The current balance feedback circuit of claim 1, wherein said multi-phase DC-DC switching converter comprises a master phase and a slave phase, and wherein said secondary pulse modulation signal is used to control said slave phase.

10. The current balance feedback circuit of claim 9, wherein said master phase further comprises a second pulse expander, configured to provide a fixed delay to control said master phase.

11. The current balance feedback circuit of claim 10, wherein a fixed signal is provided at an input to said second pulse expander.

12. The current balance feedback circuit of claim 10, wherein said second pulse expander has two inputs, both connected to ground.

13. A method for current balance feedback, to improve stability of a multi-phase DC-DC switching converter, comprising:
providing a primary pulse width modulation signal with a pulse width modulator, to a first pulse expander;
comparing a master phase current with a slave phase current, with a current balance circuit, to provide a current error signal, proportional to a difference between the master phase current and the slave phase current, to said first pulse expander;
and
adding a delay in a turn-off time to the primary pulse width modulation signal, output from a pulse width modulation (PWM) comparator, using said first pulse expander, wherein a length of said delay is shorter for a higher current error signal and longer for a lower current error signal, to provide a secondary pulse modulation signal.

14. The method for current balance feedback of claim 13, wherein said delay varies linearly with said current error signal.

15. The method for current balance feedback of claim 13, wherein said primary pulse width modulation signal comprises a rising edge and a falling edge, and adding said delay to said falling edge.

16. The method for current balance feedback of claim 13, wherein said PWM comparator compares said current error signal with a reference value.

17. The method for current balance feedback of claim 13, wherein said multi-phase DC-DC switching converter comprises a master phase and a plurality of slave phases, wherein each of said plurality of slave phases includes a current balance feedback circuit.

18. The method for current balance feedback of claim 13, wherein said secondary pulse modulation signal current is balanced between multiple inductors.

19. The method for current balance feedback of claim 13, wherein said multi-phase DC-DC switching converter comprises a master phase and a slave phase, and wherein said secondary pulse modulation signal controls said slave phase.

20. The method for current balance feedback of claim 19, wherein said master phase further comprises a second pulse expander, configured to provide a fixed delay to control said master phase.

21. The method for current balance feedback of claim 20, wherein a fixed signal is provided at an input to said second pulse expander.

22. The method for current balance feedback of claim 20, wherein said second pulse expander has two inputs, both connected to ground.

* * * * *